ated Apr. 28, 1959

2,884,444
2-PHENYL-1,3 PROPANE DIOL DICARBAMATE

Frank M. Berger, Princeton, and Bernard J. Ludwig, North Brunswick, N.J., assignors to Carter Products, Inc., New York, N.Y., a corporation of Maryland No Drawing. Application January 13, 1956
Serial No. 558,848

1 Claim. (Cl. 260—482)

This invention relates to a novel organic compound and has for its object the provision of a new compound which possesses anti-convulsant activity of unusually high intensity in preventing the occurrence of electroshock seizures. This compound is 2-phenyl-1,3-propanediol dicarbamate.

The aforementioned compound of this invention is a white crystalline solid soluble in most organic solvents, but soluble to only a slight degree in water. It forms stable solutions in water and organic solvents. Upon heating or boiling with acid or alkali, this compound hydrolyzes to give the corresponding 2 substituted 1,3-propanediol, ammonia and carbon dioxide.

The novel compound may be prepared by reacting 2-phenyl-1,3-propanediol with phosgene to form the corresponding di-chlorocarbonate derivatives. This reaction is promoted by the addition to the reacting compounds of acid combining agents such as sodium hydroxide, antipyrine, dialkylaniline and the like. The di-chlorocarbonate derivative is then converted to the dicarbamate by ammoniation, using either anhydrous or aqueous ammonia.

The compound may also be prepared from the diol by ester exchange using a low molecular weight urethane. In this reaction the low molecular weight alcohol contained in 2 equivalents of urethane is replaced by 2-phenyl-1,3-propanediol to give the desired dicarbamate.

The 2-phenyl-1,3-propanediol used in making the novel compound may be prepared by any known method as, for example, by the reduction of the corresponding 2-substituted malonic ester.

To describe the invention more particularly, the following examples serve to illustrate the method of preparation of the novel compound of this invention. Example I serves to illustrate the preparation of the diol from which the novel dicarbamate is formed. Example II describes a method of preparing the novel dicarbamate from its corresponding diol.

Example I

The following example illustrates the preparation of 2-phenyl-1,3-propanediol:

50 g. of diethyl phenyl malonate were reduced in the usual manner with 12 g. of lithium aluminum hydride, the reduction being carried out in 500 ml. of anhydrous ether. The excess reducing agent was utilized using a small volume of ethyl acetate. The reaction mixture was worked up in the usual manner with water and dilute sulfuric acid, the organic components being extracted with ether. 16 g. (approx. 50% of theoretical yield) of purified product melting at 49–52° C. was obtained. *Analysis.*—Calculated: C, 71.03; H, 7.95. Found: C, 71.04; H, 7.88.

Example II

The following example describes the preparation of 2-phenyl-1,3-propanediol dicarbamate using the urethane exchange method:

20 g. of 2-phenyl-1,3-propanediol and 25 g. of ethyl urethane were dissolved in 320 ml. anhydrous toluene. 3 g. of aluminum isopropylate were added and the mixture distilled to remove the ethanol formed in the condensation of ethyl urethane with the diol. The alcohol distills in the form of an azeotrope with toluene, boiling point approximately 77° C. Distillation is continued until essentially the theoretical quantity of ethanol has been removed. The toluene is distilled from the mixture under reduced pressure, and the resulting solid extracted with hot aqueous isopropanol solution. From this solution, on cooling, there is obtained 16.5 g. of purified product, representing a yield of approximately 52% of theoretical. The purified product has a melting point of 151–152° C., and is soluble to only a slight extent in water at ordinary room temperature. *Analysis.*—Calculated for $C_{11}H_{14}N_2O_4$: N, 11.8. Found: N, 11.7.

When the compound of this invention is tested in suitable experimental animals, such as mice, for its ability to prevent the occurrence of electroshock seizures, it is found to possess unique anti-convulsant activity. It has been found, however, to be relatively ineffective in protecting animals from convulsions produced by pentylenetetrazole. The novel compound does not possess effective sleep-inducing action and does not cause paralysis of voluntary muscles unless given in very large doses. Doses that will produce sleep or paralysis on mice are greater than 2,000 mg./kg., whereas doses protecting from electroshock seizures are of the order of 60–80 mg./kg. The compound is remarkable because of its very low toxicity. The mean lethal dose in mice after intraperitoneal administration is approximately 4,000 mg./kg. and the mean lethal dose in mice after oral administration is approximately 8,000 mg./kg.

The compound of this invention is primarily intended for oral use and formed into suitable pills, tablets or capsules by well-known practices. It may be dissolved in a suitable solvent such as a mixture of water and polyethylene glycol to give a solution suitable for injection or use as an enema.

We claim:
2-phenyl-1,3-propanediol dicarbamate.

References Cited in the file of this patent
UNITED STATES PATENTS 2,724,720　　Berger et al. ＿＿＿＿＿＿＿＿＿＿＿ Nov. 22, 1955

OTHER REFERENCES

Berger: J. Pharm. Expt. Ther., vol. 104 (1952), pp. 229–33.

Berger: Chem. Abstracts, vol. 46 (1952), 1651d.

"Miltown," (publ. by Wallace Laboratories, New Brunswick, N. J., 1956), pp. 1–24.